W. G. ANDERSEN AND J. H. BREVIG.
COUPLING SLEEVE FOR TUBULAR BODIES.
APPLICATION FILED JUNE 17, 1920.

1,380,175.    Patented May 31, 1921.

Inventors
Wilhelm Gustav Andersen
and Johannes Henrik Brevig
By Lawrence Langner
Attorney.

UNITED STATES PATENT OFFICE.

WILHELM GUSTAV ANDERSEN AND JOHANNES HENRIK BREVIG, OF CHRISTIANIA, NORWAY.

COUPLING-SLEEVE FOR TUBULAR BODIES.

1,380,175.  Specification of Letters Patent.  Patented May 31, 1921.

Application filed June 17, 1920. Serial No. 389,783.

*To all whom it may concern:*

Be it known that we, WILHELM GUSTAV ANDERSEN and JOHANNES HENRIK BREVIG, both subjects of the King of Norway, and both residing at Christiania, Norway, have invented certain new and useful Improvements in Coupling-Sleeves for Tubular Bodies; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
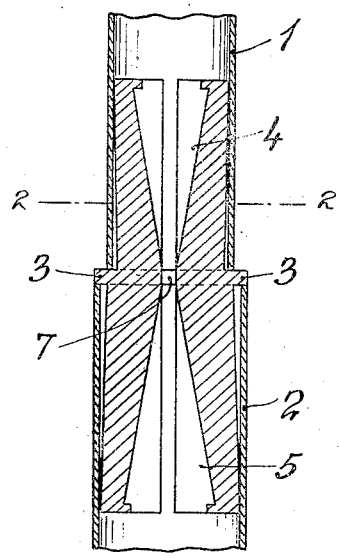
Figure 2:
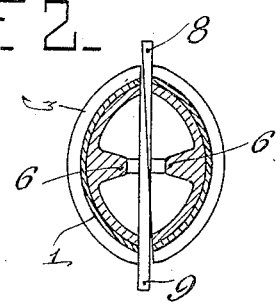

Our invention relates to means for coupling together tubes of different cross sections in an easy and reliable manner. One form of our invention is illustrated in the accompanying drawings, in which Figure 1 is a longitudinal cross sectional view of the bisected connecting sleeve mounted in place. Fig. 2 is a cross sectional view on line 2—2 in Fig. 1.

The illustrated form of the invention is adapted for coupling together the tube sections of a tubular pole for electrical lines or the like, and the bisected sleeve therefor in this instance is adapted for coupling together two tubes 1 and 2 of different diameters. In the form illustrated in the drawings these tubes 1 and 2 have an oval cross section. The coupling sleeve consists of two separate parts, each of which is provided substantially in the middle with a separating plate 3, 3. From each side of these separating plates project the bisected sleeve parts 4 and 5, respectively, the outer contour of which corresponds to the inner faces of the tubes to be connected. These half sleeves are in the middle reinforced by the aid of ribs 6 tapering toward the ends of the sleeves. When the two half sleeves have been inserted in the ends of the tubes 1 and 2 respectively, there will remain a small space or clearance 7 between the said ribs 6—6, into which clearing wedges 8, 9 are driven. As shown in Fig. 1 the sleeve projections 4 and 5 are slightly tapered inward, so that their outer parts will be pressed forcibly against the inner walls of the tubes 1 and 2 respectively, when the wedges are driven home, thereby locking the tubes securely together. As will be seen besides being reliable this locking device is also easily detachable.

Obviously the locking sleeve arrangement may as well be used for coupling together tubes of the same diameter, the sleeve parts 4 and 5 being in such case made alike. Bisected coupling sleeves of this kind may be used for tubes of any cross section, circular as well as polygonal.

Our improvement enables a very easy mounting of tubular poles, masts and the like.

We claim:—

1. A bisected coupling sleeve comprising two separate half-sleeves, each of which is provided with a separating plate for the abutment of the tubes to be coupled together, and sleeve parts projecting from each side of said plates and fitting into the ends of the said tubes, said half-sleeves leaving between them a space adapted for the driving in of wedges.

2. A bisected coupling sleeve comprising two separate half-sleeves, each of which is provided with a separating plate for the abutment of the tubes to be coupled together, and sleeve parts projecting from each side of said plates and fitting into the ends of the said tubes, said half-sleeves leaving between them a space adapted for the driving in of wedges, and said sleeve projections tapering slightly inward against the separating plates so as to be pressed forcibly with their ends against the inside of said tubes.

In testimony that we claim the foregoing as our invention, we have signed our names in presence of two subscribing witnesses.

WILHELM GUSTAV ANDERSEN.
JOHANNES HENRIK BREVIG.

Witnesses:
ROBERT H. FRAZIER,
A. B. COOK.